United States Patent [19]
Nagamura et al.

[11] Patent Number: 5,685,169
[45] Date of Patent: Nov. 11, 1997

[54] METHOD AND APPARATUS FOR PREPARING HIGH PURITY HYDROGEN BROMIDE

[75] Inventors: Takashi Nagamura; Shinji Tomita, both of Hyogo-ken, Japan

[73] Assignee: Teisan Kabushiki Kaisha, Tokyo, Japan

[21] Appl. No.: 635,954

[22] PCT Filed: Sep. 13, 1995

[86] PCT No.: PCT/JP95/01809

§ 371 Date: May 6, 1996

§ 102(e) Date: May 6, 1996

[87] PCT Pub. No.: WO96/08442

PCT Pub. Date: Mar. 21, 1996

[30] Foreign Application Priority Data

Sep. 14, 1994 [JP] Japan .................. 6-220172

[51] Int. Cl.$^6$ ........................................ F25J 3/08
[52] U.S. Cl. .................. 62/617; 62/902; 62/918; 423/481; 423/488
[58] Field of Search .............. 62/617, 902, 918; 423/481, 488

[56] References Cited

U.S. PATENT DOCUMENTS

| | | | |
|---|---|---|---|
| 3,686,076 | 8/1972 | Cupples. | |
| 3,919,398 | 11/1975 | Davis | 423/481 |
| 4,056,605 | 11/1977 | Vulikh et al. | 423/488 X |
| 4,119,413 | 10/1978 | Larsen et al. | |
| 4,254,092 | 3/1981 | Coenen et al. | 423/488 X |
| 4,557,921 | 12/1985 | Kirsch et al. | 423/488 |
| 4,668,497 | 5/1987 | Miki | 423/488 X |
| 4,892,625 | 1/1990 | Shimizu et al. | 423/488 X |
| 4,925,646 | 5/1990 | Tom et al. | 423/488 |
| 5,426,944 | 6/1995 | Li et al. | 62/617 |

OTHER PUBLICATIONS

Perry, R.H. "Perry's Chemical Engineers Handbook", 6th ed. 1984 MacGraw-Hill, New York pp. 13-5 to 13-9.
Patent Abstracts of Japan, vol. 018, No. 248 (C-1198), 12 May 1994, JP,A,06 032601 (Asahi Denka Kogya KK) 8 Feb. 1994.

*Primary Examiner*—Christopher Kilner
*Attorney, Agent, or Firm*—Oblon, Spivak, McClelland, Maier & Neustadt, P.C.

[57] ABSTRACT

A method and apparatus for preparing high purity hydrogen bromide, wherein a starting hydrogen bromide which contains impurities having low boiling points is supplied to an intermediate space. While the gas phase of the starting hydrogen bromide is allowed to ascend through an upper rectifying section, it is brought into contact with a first reflux solution flowing in the reverse direction. The uncondensed gas stored in an upper space is cooled and partly condensed. The condensed liquid is allowed to flow down through an upper rectifying section as the first reflux solution. The liquid-phase of the starting hydrogen bromide is mixed with the first reflux solution in the intermediate space and serves as a second reflux solution. The liquid stored in a lower space is heated and partly evaporated. The liquid stored in the lower space is supplied outside as high purity hydrogen bromide. The uncondensed gas stored in the upper space is discharged outside.

10 Claims, 2 Drawing Sheets

METHOD AND APPARATUS FOR PREPARING HIGH PURITY HYDROGEN BROMIDE

TECHNICAL FIELD

The present invention relates to a method and apparatus for preparing high purity hydrogen bromide (HBr).

BACKGROUND ART

Hydrogen bromide has been used in etching and others of a semiconductor manufacturing process in place of fluorocarbon gases whose influence on the ozone layer has been questioned and whose utilization is regulated. Hence, there is a demand for developing the technique of preparing high purity hydrogen bromide in a large amount.

An example of a conventional method for preparing high purity hydrogen bromide will be described with reference to FIG. 2. In a cylinder 1, a raw material consisting of hydrogen bromide and impurities is stored. The raw material is evaporated by heating the cylinder 1. The hydrogen bromide gas thus generated is adjusted to a predetermined pressure by means of a pressure regulating valve 2 and introduced into an adsorber 3 filled with molecular sieves. By virtue of the molecular sieves, the impurities other than moisture contained in the gas are removed then the gas is fed to a drier 4 filled with a desiccant to remove the moisture, thereby purifying the hydrogen bromide gas. The hydrogen bromide gas thus purified is introduced into a product cylinder 5. Subsequently the hydrogen bromide gas is cooled by a refrigerant 6 which is a mixture of dry ice and ethyl alcohol, condensed, and stored in the product cylinder 5.

However, in the method for purifying hydrogen bromide mentioned above, the molecular sieves gradually deteriorates with the passage of operation time of the apparatus. So does the purity of the product. To maintain the purity of a product at a predetermined level, molecular sieves must be replaced frequently. Hence, the aforementioned purifying method is not suitable for preparing high purity hydrogen bromide in a large amount.

DISCLOSURE OF INVENTION

The present invention is intended to provide a method and apparatus capable of preparing high purity hydrogen bromide continuously in a large amount.

A method for preparing high purity hydrogen bromide according to the present invention comprises the steps of:

providing a rectifying column composed of a lower space, a lower rectifying section, an intermediate space, an upper rectifying section, and an upper space, which are positioned in the order mentioned from the bottom toward the top;

supplying a raw material consisting of hydrogen bromide and impurities having boiling points lower than that of hydrogen bromide, into the intermediate space;

allowing a gas phase of the supplied raw material to ascend through the upper rectifying section while the gas phase is brought into contact with a first reflux solution flowing down from the top, leading the gas-phase to the upper space, and storing an uncondensed gas in the upper space;

cooling the uncondensed gas stored in the upper space, thereby condensing part of the uncondensed gas;

allowing the liquid thus condensed to serve as the first reflux solution and to flow down through the upper rectifying section to the intermediate space;

mixing the liquid phase of the supplied raw material with the fist reflux solution in the intermediate spacer thereby making a second reflux solution, and allowing the second reflux solution to flow down through the lower rectifying section to the lower space and then storing a liquid in the lower space;

heating the liquid stored in the lower space to evaporate part of the liquid and allowing the gas generated to contact with the second reflux solution which flows down from the top while ascending through the lower rectifying section; and discharging the liquid stored in the lower space outside in the form of high-purity hydrogen bromide, simultaneously discharging the uncondensed gas stored in the upper space outside.

A temperature of cooling the uncondensed gas in the upper space is preferred to fall within the range of $-30°$ C. to $-50°$ C. On the other hand, a temperature of heating the solution stored in the lower space is preferred to fall within the range of $-15°$ C. to $-20°$ C.

The apparatus for preparing high purity hydrogen bromide, employed in the aforementioned method, comprises:

a rectifying column comprising a longitudinal pressure vessel which is divided into, a lower space, a lower rectifying section in which plural stages of rectifying plates are disposed, an intermediate space, an upper rectifying section in which plural stages of rectifying plates are disposed, and an upper space which are positioned in the order mentioned from the bottom toward the top;

means for supplying a raw material consisting of hydrogen bromide and impurities having boiling points lower than that of hydrogen bromide, into the intermediate space;

a first heat exchanger for cooling and condensing part of the gas stored in the upper space;

a second heat exchanger for heating and evaporating part of the liquid stored in the lower space;

means for discharging gas stored in the upper space outside the rectifying column in the form of gas rich in impurities; and a product take-out means for taking out the liquid stored in the lower space outside the rectifying column in the form of high purity hydrogen bromide.

Hereinbelow, we will describe a process for purifying hydrogen bromide using the purification apparatus of the present invention.

Raw material consisting of hydrogen bromide and impurities having boiling points lower than that of hydrogen bromide, is supplied to the intermediate space in the form of a gas-liquid mixture. The gas phase contains impurities in a relatively large amount; in contrast, the liquid phase contains impurities in a relatively small amount.

The gas phase of the raw material ascends through the upper rectifying column. In the upper rectifying column, hydrogen bromide liquid containing a relatively small amount of impurities flows down as a first reflux solution. Therefore, the gas phase comes into contact with the first reflux solution flowing in the reverse direction. Owing this contact, a component of the gas phase having a high boiling point, namely, hydrogen bromide is condensed and incorporated into the first reflux solution. On the other hand, components having low boiling points, namely, impurities, contained in the first reflux solution, are evaporated. The gas stored in the upper space is cooled by the first heat exchanger and partly condensed. By setting the cooling temperature to an appropriate condition such as a temperature from −30° C. to −50° C., it is possible to reduce the content of impurities of the condensed liquid. The condensed liquid is returned to the upper rectifying section and then flows down through the rectifying section as the first reflux solution. As a result, the uncondensed gas is stored in the upper space, while hydrogen bromide liquid containing impurities in a relatively small amount, is stored in the intermediate space. The uncondensed gas rich in impurities is discharged outside the upper space.

On the other hand, the liquid phase of the raw material is mixed, in the intermediate space, with the first reflux solution flowing from the upper rectifying section. The resulting mixture solution flows down through a lower rectifying section as a second reflux solution and stored in the lower space. In the lower space, the stored liquid, that is high purity hydrogen bromide as will be described later, is heated and partly evaporated by a second heat exchanger. By setting the heating temperature to an appropriate condition such as −15° C. to −20° C., the content of impurities in the stored liquid can be reduced. The generated gas ascends through the lower space and comes into contact with the second reflux solution flowing in the reverse direction. Consequently, hydrogen bromide of the gas phase is condensed and incorporated into the second reflux solution; on the other hand, the impurities contained in the second reflux solution is evaporated. As a result, high purity hydrogen bromide liquid is stored in the lower space. The high purity hydrogen bromide liquid is taken out and recovered as a product.

The first heat exchanger may be disposed either outside or inside the upper space. In the case where the first heat exchanger is disposed outside, uncondensed gas stored in the upper space is introduced into the first heat exchanger and partly condensed by exchanging heat with a refrigerant. Thereafter, the produced liquid is returned to the upper space and remained uncondensed gas is discharged outside. In the case where the first heat exchanger is disposed inside the upper space, part of the uncondensed gas is condensed by exchanging heat with a refrigerant, in the upper space. On the other hand, the other part of the uncondensed gas is discharged outside from a portion in the vicinity of the top of the upper space.

The second heat exchanger is desirably disposed outside the lower space. In this case, the liquid stored in the lower space is introduced into the second heat exchanger and partly evaporated by exchanging heat with the atmosphere. Thereafter, the generated gas is returned into the lower space.

By this procedure, the temperature and pressure of the lower space are successfully controlled and mainly impurities of the liquid stored in the lower space are evaporated, with the result that the purification degree of hydrogen bromide contained in the liquid is increased.

Furthermore, it is desirable to dispose a third heat exchanger inside the lower space in addition to the second heat exchanger. In this case, the raw material supply means is used for supplying the raw material to the intermediate space by way of a flow passage located on the heating medium side of the third heat exchanger.

The raw material is thereby successfully cooled to a predetermined temperature and supplied to the intermediate space.

It is preferred that a storage tank is disposed outside the rectifying column. In this case, liquefied high-purity hydrogen bromide stored in the lower space is transferred to the storage tank by the product take-out means and stored therein.

In this case, a hydrogen bromide gas is cooled to a temperature from −15° C. to −20° C. and condensed by disposing the heat exchanger on a level higher than the inner surface of the liquid stored in the storage tank.

BEST MODE FOR CARRYING OUT THE INVENTION

Figure 1:
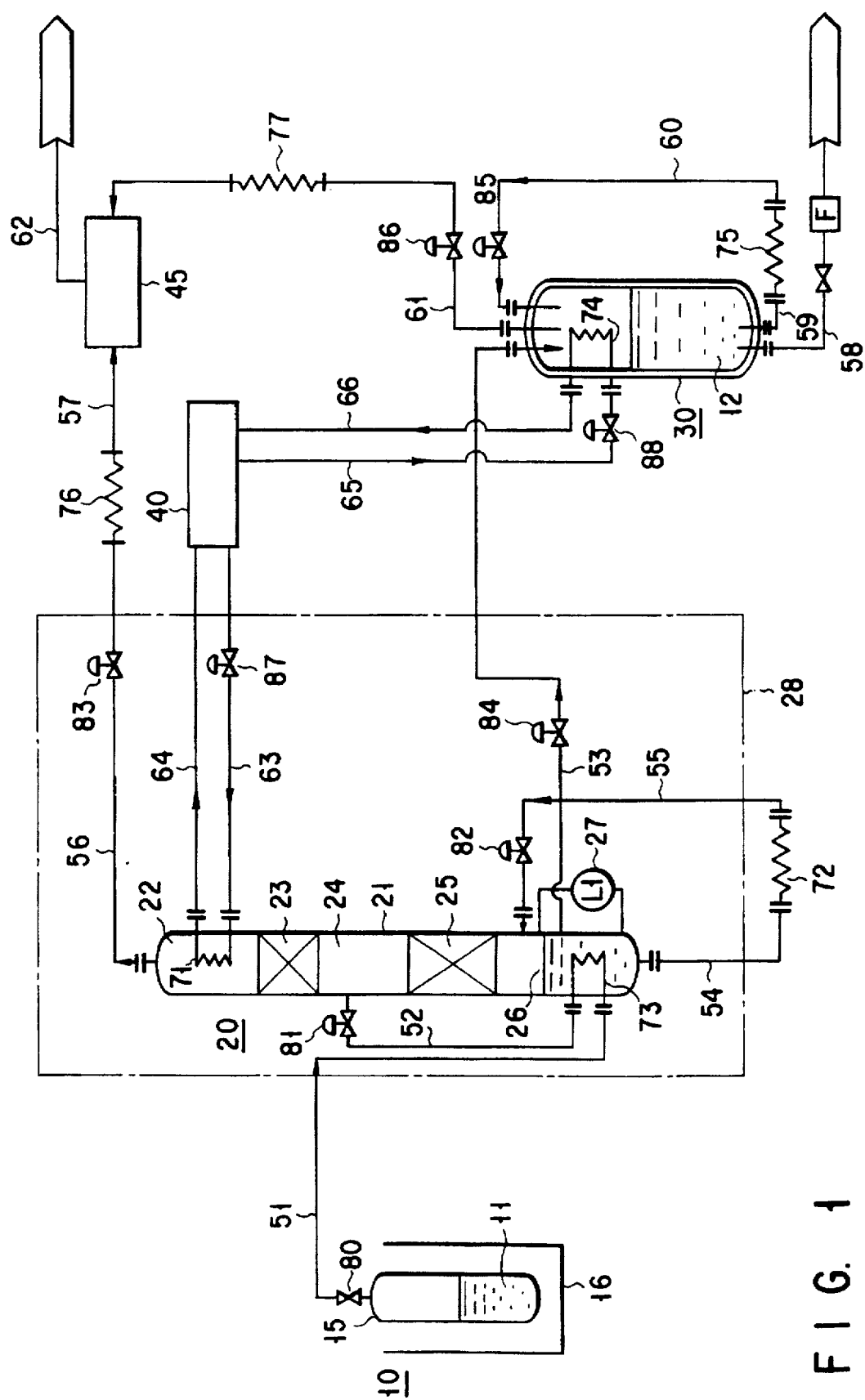
FIG. 1: A block diagram showing an embodiment of the apparatus for preparing high purity hydrogen bromide according to the present invention.
Figure 2:
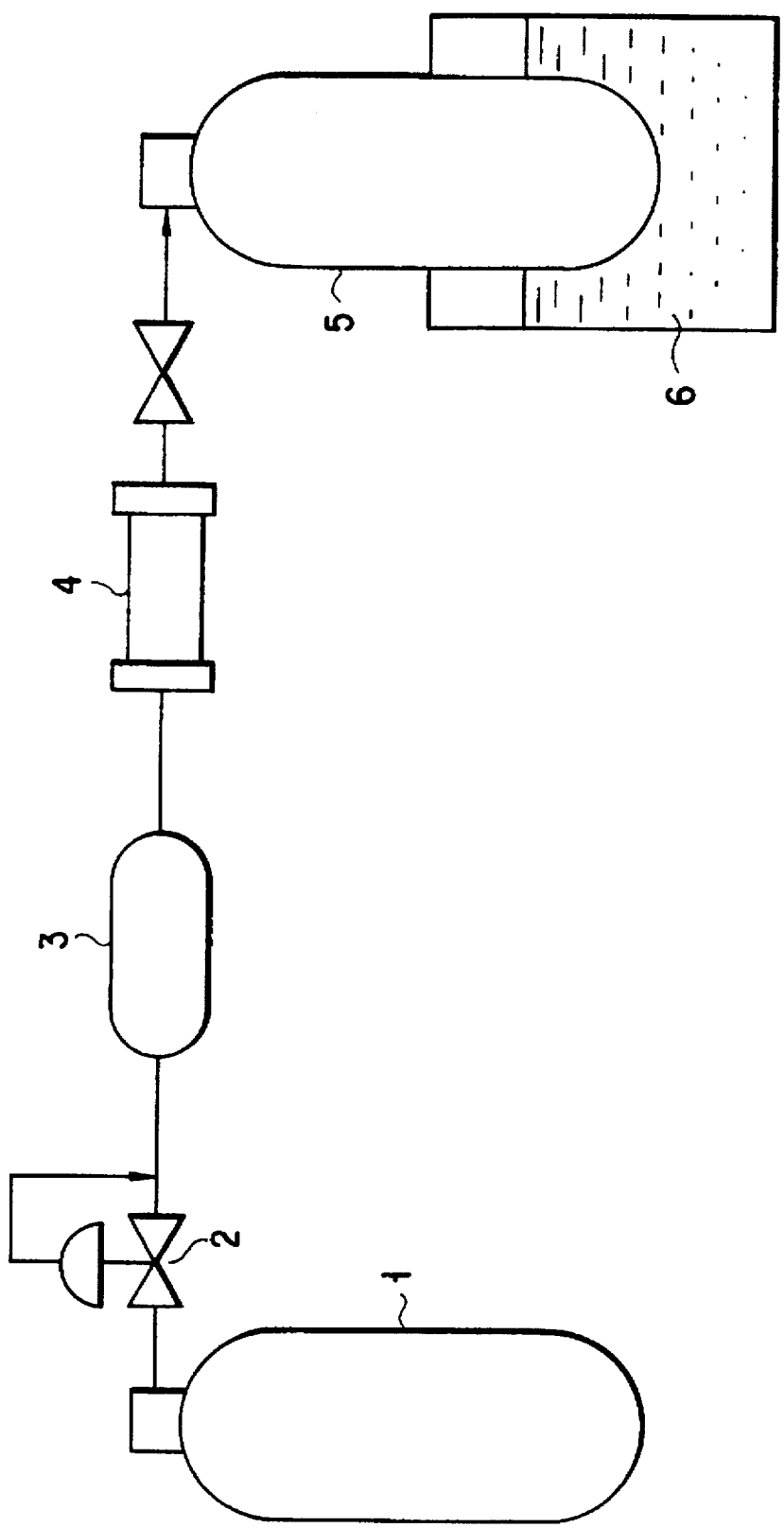
FIG. 2: A block diagram showing an embodiment of an apparatus for preparing high purity hydrogen bromide in the prior art.

FIG. 1 shows an example of a block diagram of the apparatus for preparing the high purity hydrogen bromide according to the present invention.

The apparatus is mainly composed of the following three portions: a raw-material supply section 10, a rectifying column 20, and a product storage tank 30. Furthermore, the apparatus comprises additional equipments such as a refrigerator 40, a detoxifying apparatus 45, and pipes and valves. The rectifying column 20 is housed in a thermal insulation container 28 together with the additional equipments.

The raw-material supply section 10 comprises; a cylinder 15 for storing a raw material consisting of hydrogen bromide and impurities having boiling points lower that of hydrogen bromide; a heater 16 accommodating the cylinder 15 for heating the raw material 11; and a pressure regulating valve 80 connected to the top portion of the cylinder 15. The pressure regulating valve 80 is connected to the rectifying column 20 by way of a pipe 51.

The rectifying column 20 is constructed by layering the following five portions consecutively from the bottom, thereby forming a single pressure vessel 21 as a whole. A lower space 26 is formed between the bottom of the pressure vessel 21 and the lower surface of a lower rectifying section 25. The lower rectifying section 25 is formed by disposing plural stages of rectifying plates. An intermediate space 24 is formed between the upper surface of the lower rectifying section 25 and the lower surface of the upper rectifying space 23. The upper rectifying section 23 is formed by disposing plural stages of rectifying plates. An upper space 22 is formed between the top portion of the pressure vessel 21 and the upper surface of the upper rectifying section 23.

Inside the lower space 26, a third heat exchanger 73 is disposed. The inlet-side of the heating medium of the third heat exchanger 73 is connected to a raw-material supply section 10 by way of a pipe 51 and a pressure regulating valve 80. On the other hand, the outlet side thereof is connected to the intermediate space 24 of the rectifying column 20 by way of a pipe 52 and an expansion valve 81.

Furthermore, onto the outside of the lower space 26 is connected a second heat exchanger 72 using the atmosphere as a heat source. The inlet side of the cooling medium of the second heat exchanger 72 is connected to a portion in the vicinity of the bottom of the lower space 26. On the other hand, the outlet side thereof is connected to a portion in the vicinity of the top of the lower space 26 by way of a pipe 55 and a pressure regulating valve 82. It should be noted that the second heat exchanger 72 is disposed outside the heat insulation container 26 at a level lower than that of a predetermined liquid surface of the lower space 26.

To the portion lower than the predetermined liquid surface of the lower space 26 is connected a pipe 53 for taking out liquid (liquefied high purity hydrogen bromide). The pipe 53 is connected to a portion in the vicinity of the top of the product storage tank 30 by way of a pressure regulating valve 84. To the lower space 26, a liquid level gauge 27 is attached.

Inside of the upper space 22, a first heat exchanger 71 is disposed. The inlet side of the cooling medium of the first heat exchanger 71 is connected to a refrigerator 40 by way of a pipe 63 and an expansion valve 87. On the other hand, the outlet side thereof is connected to the refrigerator 40 by way of a pipe 64. It should be noted that the first heat exchanger 71 may be provided outside the upper space 22.

To the top portion of the upper space 22 is connected a pipe 56 for discharging the gas (uncondensed gas mainly composed of impurities) stored in the top portion. The pipe 56 is further connected to a detoxifying apparatus 45 by way of a pressure regulating valve 83, a heater 76 and a pipe 57.

A product storage tank 30 is a thermal insulation container the outside portion of which is covered with an insulating layer.

Above the liquid surface in the product storage tank 30, a heat exchanger 74 is disposed. The inlet side of the cooling medium of the heat exchanger 74 is connected to the refrigerator 40 by way of a pipe 65 and an expansion valve 88. The outlet side thereof is connected to the refrigerator 40 by way of a pipe 66.

Onto the outside of the product storage tank 30 is connected a heat exchanger 75 using the atmosphere as a heat source. The inlet side of the cooling medium of the heat exchanger 75 is connected to a portion in the vicinity of the bottom of the product storage tank 30 by way of a pipe 59. On the other hand, the outlet side thereof is connected to a portion in the vicinity of the top of the product storage tank 30 by way of a pressure regulating valve 85.

To the bottom of the product storage tank 30 is connected a pipe 58 for supplying a product (liquefied high-purity hydrogen bromide) outside.

The top portion of the product storage tank 30 is connected to the detoxifying apparatus 45 by way of a pipe 61, a relief valve 86, and a heater 77.

Hereinbelow, we will explain a process for preparing high purity hydrogen bromide using the rectifying column shown in FIG. 1. Table 1 shows a typical formulation of a raw material consisting of substantially hydrogen bromide used herein. The raw material consists of 97.96 vol % of hydrogen bromide and impurities including hydrogen ($H_2$), hydrochloric acid (HCl), methane ($CH_4$), nitrogen ($N_2$), carbon dioxide ($CO_2$), carbon monoxide (CO) and the like whose boiling points are lower than that of hydrogen bromide. It should be noted that the content of moisture ($H_2O$) is 2 ppm or less.

TABLE 1

Composition Example of Raw Material Hydrogen Bromide (HBr)

| Components | Contents (vol ppm, vol %) | Boiling Points at 1 atm (°C.) |
|---|---|---|
| $H_2$ | 17,000 vol ppm | −252 |
| $N_2$ | 50 | −196 |
| CO | 42 | −192 |
| Ar | 1 | −185 |
| $O_2$ | 1 | −183 |
| $CH_4$ | 65 | −162 |
| $C_2H_6$ | 2 | −89 |
| HCl | 3,200 | −85 |
| $CO_2$ | 44 | −78 |
| $H_2O$ | <2 | +100 |
| HBr | 97.96 vol % | −67 |

The raw material stored in the cylinder 15 in a liquid state is heated by the heater 16, evaporated into a gas having a pressure of approximately 20 kg/cm$^2$G at a temperature of approximately 35° C. The gas is then introduced into the heating medium side of the third heat exchanger 73 disposed inside the lower space 26. Subsequently, the gas is cooled by exchanging heat with liquid (liquefied high purity hydrogen bromide) stored in the lower space 26. The resultant gas is introduced in the expansion valve 81. Thereafter, it is adiabatically expanded and introduced into the intermediate space 24 in the form of gas-liquid mixture having a pressure of approximately 8 kg/cm$^2$ at a temperature of approximately −20° C. The loading amount of the raw material used in this example is set to 1000 Nm$^3$/h. In the gas phase of the raw material introduced in the intermediate space 24, impurities are contained in a relatively large amount and in the liquid phase, the impurities are contained in a relatively small amount.

The gas phase of the raw material ascends through the upper rectifying section 23. In the upper rectifying section 23, a first reflux solution, namely, hydrogen bromide containing a relatively small amount of impurities flows down from the top. Therefore, the current of the gas phase comes into contact with the first reflux solution reversely flowing. Owing to the contact, a component having a high boiling point, namely, hydrogen bromide contained in the gas-phase is condensed and incorporated into the first reflux solution. On the other hand, components having low boiling points, namely, impurities contained in the reflux solution are evaporated.

In the upper space 22, the stored gas is cooled to a temperature from −30° C. to −50° C. by the first heat exchanger 71. As a result, mainly hydrogen bromide in the gas is condensed. Thus, most of the condensed liquid is hydrogen bromide which includes a small amount of impurities having low boiling points.

The condensed liquid is returned to the upper rectifying section 23 and then flows down as the first reflux solution through the section 23.

As a result, the uncondensed gas rich in impurities is stored in the upper space. The hydrogen bromide liquid containing a relatively small amount of impurities is stored in the intermediate space.

The uncondensed gas rich in impurities is led from the upper space 22 to the detoxifying apparatus 45 by way of the pressure regulating valve 83 and the heater 76.

In the detoxifying apparatus 45, hydrogen chloride, hydrogen bromide and carbon monoxide contained in small amounts are removed from the uncondensed gas, the resultant uncondensed gas is discharged outside.

In the case of the formula shown in Table 1, if a loading amount of the raw material is set to 1000 Nm³/h, the amount of the uncondensed gas thus discharged will be 69 Nm³/h.

On the other hand, in the intermediate space 24, the liquid-phase of the raw material is mixed with the first reflux solution flowing from the upper rectifying section 23. The mixture solution flows down as the second reflux solution through the lower rectifying section 25 and stored in the lower space 26.

The liquid stored in the lower space 26, that is high purity hydrogen bromide as will be described later, is heated by the second heat exchanger 72 and third heat exchanger 73 to a temperature from −15° C. to −20° C. Then, a small amount of impurities contained in the liquid is evaporated together with hydrogen bromide.

The second heat exchanger 72 disposed outside the lower space 26 has a function of controlling an inner temperature and pressure of the lower space 26. Since the second heat exchanger 72 is disposed at a level lower than a predetermined liquid surface of the lower space 26, the liquid stored in the lower space is led to the second heat exchanger 72 by gravity. The liquid is warmed therein, partly evaporated and returned to a portion in the vicinity of the top of the lower space. Therefore, the liquid can be automatically circularized by means of the heat exchanger 72, pipe 55 and pressure regulating valve 82, alone. In other words, a pump or the like is not required to circularize the liquid.

The generated gas ascends through the lower rectifying section 25 and comes into contact with the second reflux solution flowing in the reverse direction. The hydrogen bromide contained in the gas phase is condensed and incorporated into the second reflux solution. On the other hand, impurities present in the second reflux solution are evaporated.

The condensed gas ascending to the intermediate space 24 is mixed with the gas phase of the raw material and further ascend through the upper rectifying section 23 in the same manner as mentioned above.

As a result, liquefied high purity hydrogen bromide (99.9999%) is stored in the lower space 26.

The liquefied high purity hydrogen bromide is taken out as a product from the lower space 26 and allowed to pass through the pipe 53 and the pressure regulating valve 84 and then stored in a product storage tank 30 placed outside.

In the case of the formula show in Table 1, if a loading amount of the raw material is set to 1000 Nm³/h, the amount of the high-purity hydrogen bromide thus purified is 931 Nm³/h in terms of a gas volume.

In the product storage tank 30, a temperature of the liquefied high purity hydrogen bromide is approximately −20° C. and a pressure thereof is approximately 8 kg/cm²G. The relative relationship with the pressure in the rectifying column in this example is as follows: the pressure of the lower space 26 is higher than that of the intermediate space 24 by about 0.3 kg/cm² and the pressure of the product storage tank 30 is lower than that of the lower space 26 by about 0.5 kg/cm².

The liquefied high purity hydrogen bromide is derived from the bottom portion of the product storage tank 30, allowed to pass through the pipe 58, and supplied, as a product, into a consuming equipment (not shown in the figure).

The heat exchanger 75 connected onto the outside of the product storage tank 30 is used for heating the liquefied hydrogen bromide introduced from the product storage tank 30 by exchanging heat with the atmosphere. The generated gas is allowed to pass through the pressure regulating valve 85 and returned to a portion in the vicinity of the top of the product storage tank 30. This passage line is used for controlling the pressure of the tank when the liquefied hydrogen bromide is expelled out.

The heat exchanger 74 disposed at a level higher than the liquid surface inside the product storage tank 30 is used for cooling and condensing hydrogen bromide gas generated in the tank, thereby regulating a temperature and pressure of the tank.

Furthermore, the relief valve 86 connected to the top of the product storage tank 30 is used for discharging the vapor of the tank outside by way of a heater 77 and a detoxifying apparatus 45 in case of excessive pressure increase in the product storage tank.

In this embodiment, to use the latent heat and sensible heat of a starting hydrogen bromide as a heat source for heating the liquid stored in the lower space 26, the third heat exchanger 73 is disposed in the lower space 26. The raw material is allowed to pass through the third heat exchanger and introduced into the intermediate space 24. However, the present invention is not limited to this embodiment. The lower space 26 can be heated by the second heat exchanger 72 alone. In this case, the starting hydrogen bromide gas can be introduced directly from the raw material supply section to the intermediate space 24.

As mentioned in the foregoing, in the method and apparatus for preparing high purity hydrogen bromide of the present invention, since hydrogen bromide is purified by using two-stage rectifying column, impurities having boiling points lower than that of hydrogen bromide can be removed without failure. As a result, liquefied hydrogen bromide having a purity degree of 99.9999% can be prepared continuously in a large amount.

We claim:

1. A method for preparing high purity hydrogen bromide, which comprises:

(a) providing a rectifying column, comprising:
a lower space,
a lower rectifying section,
an intermediate space,
an upper rectifying section,
an upper space,
which are positioned in the order mentioned from the bottom toward the top;

(b) supplying a raw material consisting of hydrogen bromide and impurities having boiling points lower than that of hydrogen bromide, into the intermediate space;

(c) allowing a gas phase of the supplied raw material to ascend through the upper rectifying section while said gas phase is brought into contact with a first reflux solution flowing down from the top, leading said gas phase to said upper space, and storing an uncondensed gas in said upper space;

(d) cooling said uncondensed gas stored in said upper space, thereby condensing part of said uncondensed gas;

(e) allowing the liquid thus condensed to serve as said first reflux solution and to flow down through the upper rectifying section to the intermediate space;

(f) mixing the liquid phase of said supplied raw material with said first reflux solution in the intermediate space, thereby making a second reflux solution, and allowing said second reflux solution to flow down through said lower rectifying section to said lower space and then storing a liquid in said lower space;

(g) heating the liquid stored in said lower space to evaporate part of said liquid and allowing the gas generated to contact with said second reflux solution which flows down from the top while ascending through said lower rectifying sections; and (h) discharging said liquid stored in said lower space outside in the form of high-purity hydrogen bromide, simultaneously discharging said uncondensed gas stored in the upper space outside.

2. The method of claim 1, wherein said uncondensed gas stored in said upper space is cooled to a range of within −30° C. to −50° C., and said solution stored in said lower space is heated to a temperature of from about −15° C. to −20° C.

3. An apparatus for preparing high hydrogen bromide, comprising:

a rectifying column, comprising a longitudinal pressure vessel which is divided into a lower space, a lower rectifying section in which plural stages of rectifying plates are disposed, an intermediate space, an upper rectifying section in which plural stages of rectifying plates are disposed, and an upper space, which are positioned in the order mentioned from the bottom toward the top;

means for supplying a raw material consisting of hydrogen bromide and impurities having boiling points lower than that of hydrogen bromide, into said intermediate space;

a first heat exchanger for cooling and condensing part of an uncondensed gas stored in said upper space;

a second heat exchanger for heating and evaporating part of a liquid stored in said lower space;

a means for discharging gas stored in said upper space outside the rectifying column in the form of gas rich in impurities;

a product recovery means for recovering said liquid stored in said lower space outside the rectifying the column in the form of high purity hydrogen bromide and a cryogenic storage tank outside said rectifying column, wherein said product recovery means is used for sending high purity hydrogen bromide stored in said lower space to said cryogenic storage tank.

4. The apparatus for preparing high purity hydrogen bromide according to claim 3, wherein a heat exchanger is disposed at a level higher than the liquid surface inside said cryogenic storage tank and hydrogen bromide gas generated is cooled to a temperature in the range of −15° C. to −20° C. to condense.

5. An apparatus for preparing high purity hydrogen bromide, comprising:

a rectifying column, comprising a longitudinal pressure vessel which is divided into a lower space, a lower rectifying section in which plural stages of rectifying plates are disposed, an intermediate space, an upper rectifying section in which plural stages of rectifying plates are disposed, and an upper space, which are positioned in the order mentioned from the bottom toward the top;

means for supplying a raw material consisting of hydrogen bromide and impurities having boiling points lower than that of hydrogen bromide, into said intermediate space;

a first heat exchanger for cooling and condensing part of an uncondensed gas stored in said upper space;

a second heat exchanger for heating and evaporating part of a liquid stored in said lower space;

a means for discharging gas stored in said upper space outside the rectifying column in the form of gas rich in impurities;

a product recovery means for recovering said liquid stored in said lower space outside the rectifying column in the form of high purity hydrogen bromide, said second heat exchanger being disposed outside said lower space and used for introducing said liquid stored in said lower space and evaporating it by exchanging heat with the atmosphere and the gas generated is returned in said lower space and a third heat exchanger which is disposed in said lower space wherein said means for supplying a raw material is used for supplying a raw material to said intermediate space by way of a flow passage located on a heating medium side of said third heat exchanger.

6. An apparatus for preparing high purity hydrogen bromide, comprising:

a rectifying column, housed in a thermal insulation container, comprising a longitudinal pressure vessel which is divided into a lower space, a lower rectifying section in which plural stages of rectifying plates are disposed, an intermediate space, an upper rectifying section in which plural stages of rectifying plates are disposed, and an upper space, which are positioned in the order mentioned from the bottom toward the top;

means for supplying a raw material consisting of hydrogen bromide and impurities having boiling points lower than that of hydrogen bromide, into said intermediate space;

a first heat exchanger for cooling and condensing part of an uncondensed gas stored in said upper space;

a second heat exchanger for heating and evaporating part of a liquid stored in said lower space;

a means for discharging gas stored in said upper space outside the rectifying column in the form of gas rich in impurities;

a product recovery means for recovering said liquid stored in said lower space outside the rectifying column in the form of high purity hydrogen bromide and wherein said first heat exchanger is disposed inside said upper space and used for condensing said uncondensed gas stored in said upper space by exchanging heat with a refrigerant located outside said thermal insulation container.

7. An apparatus for preparing high purity hydrogen bromide, comprising:

a rectifying column, comprising a longitudinal pressure vessel which is divided into i) a lower space, ii) a lower rectifying section in which plural stages of rectifying plates are disposed, iii) an intermediate space, iv) an upper rectifying section in which plural stages of rectifying plates are disposed, and v) an upper space, which are positioned in the order mentioned from the bottom toward the top;

vi) means for supplying a raw material consisting of hydrogen bromide and impurities having boiling points lower than that of hydrogen bromide, into said intermediate space;

vii) a first heat exchanger for cooling and condensing part of an uncondensed gas stored in said upper space;

viii) a second heat exchanger which is disposed outside said lower space and used for introducing said liquid stored in said lower space and evaporating it by exchanging heat with the atmosphere and wherein the gas generated is returned in said lower space;

ix) a third heat exchanger which is disposed in said lower space wherein said means for supplying a raw material is used for supplying a raw material is used for supplying a raw material to said intermediate space by way of a flow passage located on a heating medium side of said third heat exchanger;

x) means for discharging gas stored in said upper space outside the rectifying column in the form of gas rich in impurities; and xi) product recovery means for recovering said liquid stored in said lower space outside the rectifying column in the form of high purity hydrogen bromide.

8. An apparatus for preparing high purity hydrogen bromide, comprising:

a rectifying column, comprising a longitudinal pressure vessel which is divided into i) a lower space, ii) a lower rectifying section in which plural stages of rectifying plates are disposed, iii) an intermediate space, iv) an upper rectifying section in which plural stages of rectifying plates are disposed, and v) an upper space, which are positioned in the order mentioned from the bottom toward the top;

vi) means for supplying a raw material consisting of hydrogen bromide and impurities having boiling points lower than that of hydrogen bromide, into said intermediate space;

vii) a first heat exchanger for cooling and condensing part of an uncondensed gas stored in Said upper space;

viii) a second heat exchanger for heating and evaporating pat of a liquid stored in said lower space;

ix) means for discharging gas stored in said upper space outside the rectifying column in the form of gas rich in impurities; and x) product recovery means for recovering said liquid stored in said lower space outside the rectifying column in the form of high purity hydrogen bromide, and xi) cryogenic storage means.

9. The apparatus of claim 8, wherein a heat exchanger is disposed at a level higher than the liquid surface inside the cryogenic storage tank and hydrogen bromide gas generated is cooled to a temperature in the range of $-15°$ C. to $-20°$ C. to condense.

10. The apparatus of claim 8, wherein said cryogenic storage means is a tank.

* * * * *